United States Patent
Zhang et al.

(10) Patent No.: US 12,407,450 B1
(45) Date of Patent: Sep. 2, 2025

(54) WIRELESS COMMUNICATION METHOD AND DEVICE FOR IMPROVING FORWARD TRANSMISSION RATE

(71) Applicant: NANJING QINHENG MICROELECTRONICS CO., LTD., Nanjing (CN)

(72) Inventors: Fangliang Zhang, Nanjing (CN); Hairui Song, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 0 days.

(21) Appl. No.: 19/004,551

(22) Filed: Dec. 30, 2024

(51) Int. Cl.
| | |
|---|---|
| *H04L 1/16* | (2023.01) |
| *H04L 1/00* | (2006.01) |
| *H04L 1/1607* | (2023.01) |
| *H04L 1/18* | (2023.01) |

(52) U.S. Cl.
CPC .......... *H04L 1/1642* (2013.01); *H04L 1/1671* (2013.01)

(58) Field of Classification Search
CPC ... H04L 1/1642; H04L 1/1671; H04L 1/1874; H04L 12/66; H04W 28/06; H04W 84/12; H04W 80/00; H04W 92/02; H04W 76/10
See application file for complete search history.

(56) References Cited

U.S. PATENT DOCUMENTS

| | | | | |
|---|---|---|---|---|
| 7,620,062 B2 * | 11/2009 | Kobayashi | ............ | H04L 5/1446 345/530 |
| 8,064,461 B2 * | 11/2011 | Nishida | .................. | H04L 1/1874 714/751 |
| 11,757,564 B2 * | 9/2023 | Yang | ..................... | H04W 24/08 370/329 |

FOREIGN PATENT DOCUMENTS

| | | |
|---|---|---|
| CN | 103002510 A | 3/2013 |
| CN | 113099392 A | 7/2021 |
| CN | 113286000 A | 8/2021 |
| CN | 117061624 A | 11/2023 |
| CN | 117220837 A | 12/2023 |
| EP | 2456114 A1 | 5/2012 |

\* cited by examiner

*Primary Examiner* — Justin R Knapp
(74) *Attorney, Agent, or Firm* — CBM PATENT CONSULTING, LLC

(57) ABSTRACT

Disclosed are a wireless communication method and a wireless communication device for improving a forward transmission rate. A transmission cycle comprises a forward transmission part and a reverse transmission part; the forward transmission part of one transmission cycle is divided into N segments, N≥2, in each segment, a first communication end regularly transmits a valid data frame or an empty packet or does not transmit the valid data frame or the empty packet to a second communication end according to the fact that whether the valid data frame exists or not is detected, and when it is detected that the valid data frame does not exist, the last valid data frame is automatically retransmitted; and the valid data frame comprises a sequence number, and the sequence number is used by the second communication end to eliminate a repeated valid data frame.

6 Claims, 2 Drawing Sheets

Prior Art

WIRELESS COMMUNICATION METHOD AND DEVICE FOR IMPROVING FORWARD TRANSMISSION RATE

CROSS-REFERENCE TO RELATED APPLICATIONS

This application claims priority to Chinese Patent Application Ser. No. CN2024101948715 filed on 22 Feb. 2024.

TECHNICAL FIELD

The present invention relates to a wireless communication technology, in particular to a wireless communication method and a wireless communication device for improving a forward transmission rate.

BACKGROUND

In the technical field of wireless communication, there are application scenarios in which one end transmits a large amount of data and the other end transmits a small amount of data, such as a mouse end and a dongle end of a wireless mouse, a remote controller and a body of an unmanned aerial vehicle, and the like.

Taking the wireless mouse as an example, there are two communication methods in the prior art. According to a first method, data are transmitted unidirectionally, and the other party does not make a response. This method has the disadvantage that the use of product function may be affected by a packet loss, for example, in the case of double-clicking with a left mouse button, when one packet of data is lost, the double-clicking becomes single-clicking with the mouse. According to a second method, bidirectional communication is adopted, in which a mode of asking and answering interchangeably is adopted, and one party transmits one data frame and the other party transmits one response frame. A communication process is shown in FIG. 1, wherein M→D means that the first communication end transmits the data frame to the second communication end, and D→M means that the second communication end transmits the data frame to the first communication end. For example, when the mouse end transmits a valid data frame, the mode is switched to a receiving mode, and after the dongle end receives the data frame from the mouse end, the mode is switched to a transmitting mode, and one response frame is transmitted.

A maximum data rate of a common 2.4 G chip is 2 M, that is, 0.5 us/bit.

(1) Time Ta1 for transmitting valid data frame by mouse end:

$$(16 + 32 + 16 + (8*6) + 24) * 0.5 \ us = 68 \ us$$

| Frame header | Synchronization word | Protocol header | Valid data | CRC check |
|---|---|---|---|---|
| 16 bit | 32 bit | 16 bit | 6 bytes | 24 bit |

(2) Time Ta2 for transmitting response frame by Dongle end: (16+32+16+24)*0.5 us=44 us

| Frame header | Synchronization word | Protocol header | Valid data | CRC check |
|---|---|---|---|---|
| 16 bit | 32 bit | 16 bit | 0 byte | 24 bit |

(3) Time Ta3 for switching RF from receiving mode to transmitting mode (2.4 G RF is half-duplex communication): 80 us to 100 us (common parameter)

Therefore, time from transmitting one frame of data by the mouse end to confirming the completion of data transmission is T=Ta1+Ta3+Ta2>192 us.

Although a high-speed USB mouse may theoretically achieve a return rate of 8 K, a return rate of a final product is limited due to certain limitations of 2.4 G wireless communication.

SUMMARY

Objective of the invention: in order to solve the problems of packet loss and limited transmission rate of wireless communication in the prior art, the present invention provides a wireless communication method and a wireless communication device for improving a forward transmission rate.

Technical solution: a wireless communication method for improving a forward transmission rate comprises a plurality of transmission cycles, wherein the transmission cycle comprises a forward transmission part and a reverse transmission part, and in the forward transmission part, a first communication end transmits data and a second communication end receives the data; and in the reverse transmission part, the second communication end transmits the data and the first communication end receives the data;

the forward transmission part of one transmission cycle is divided into N segments, N≥2, and in each segment, the first communication end regularly transmits a valid data frame or an empty packet or does not transmit the valid data frame or the empty packet to the second communication end according to the fact that whether the valid data frame exists or not is detected, which specifically comprises that:

in a first segment of the forward transmission part, when it is detected that a first valid data frame exists, the first communication end transmits the first valid data frame; and when it is detected that the first valid data frame does not exist, the first communication end transmits the empty packet or does not transmit any packet; and in a non-first segment of the forward transmission part, when it is detected that next valid data frame exists, the first communication end transmits the next valid data frame; and when it is detected that the next valid data frame does not exist, the first communication end retransmits the last valid data frame at least once; and the valid data frame comprises a sequence number, and the sequence number is used by the second communication end to eliminate a repeated valid data frame.

Further, in one transmission cycle, the reverse transmission part precedes the forward transmission part, and in the reverse transmission part, the data frame transmitted by the second communication end contains a time stamp, and the first communication end performs synchronization calibration according to the time stamp after receiving the data frame containing the time stamp.

Further, the second communication end is switched to a receiving mode after transmitting the data frame, and when the second communication end does not receive the packet transmitted by the first communication end in a timeout mode, the second communication end is switched back to a transmitting mode and transmits the same data frame to the first communication end.

Further, in the reverse transmission part, the data frame transmitted by the second communication end contains a packet reception identifier, the packet reception identifier is used for showing whether packets transmitted by the first communication end are all successfully received, and when the packets are all successfully received, the first communication end continues to transmit subsequent packets; and when the packets are not all successfully received, the first communication end retransmits the packets transmitted in the last transmission cycle.

Further, in the non-first segment of the forward transmission part, when the next valid data frame does not exist, no packet is transmitted after the last valid data frame is retransmitted once, and until it is detected that the next valid data frame exists, the next valid data frame is transmitted, or until the forward transmission part is ended, the next transmission cycle is started.

Further, after the last valid data frame is retransmitted once, the first communication end enters a sleep state, and until it is subsequently detected that the next valid data frame exists, the next valid data frame is transmitted, or until the forward transmission part is ended, the first communication end withdraws from the sleep state.

Further, in the reverse transmission part, the data frame transmitted by the second communication end contains device information, and the device information is used for indicating an identity of a target first communication end.

Further, in the reverse transmission part of one transmission cycle, the second communication end transmits only one data frame.

A wireless communication device for improving a forward transmission rate comprises a first communication end and a second communication end, wherein the first communication end and the second communication end both comprise a processor, a memory and a software program stored in the memory, and the processor realizes the wireless communication method for improving the forward transmission rate above when executing the software program.

Further, a plurality of first communication ends are provided, and data transmission is performed between the second communication end and the plurality of first communication ends.

Compared with the prior art, the wireless communication method and the wireless communication device for improving the forward transmission rate provided by the present invention have the following beneficial effects.

(1) The wireless communication is realized through the transmission cycle, which is different from the prior art in that proportions of the forward transmission part and the reverse transmission part of the transmission cycle are different. In one transmission cycle, the first communication end transmits more data frames and the second communication terminal transmits fewer data frames, the first communication end transmits the plurality of data frames regularly and the corresponding second communication end transmits only one data frame as a response, and the reception of the plurality of data frames may be confirmed by one response, so that an overall number of data frames in bidirectional communication is reduced, a frequency of receiving and transmitting switching is reduced, a forward transmission rate is improved, and an effective bandwidth is increased, thus being especially suitable for occasions with a large amount of forward transmission data.

(2) Because of adopting a communication mode in which one communication end transmits data and a plurality of communication ends receive data, the packet loss cannot be found in time like a communication mode in which one communication end transmits data and one communication end receives data. Therefore, in the forward transmission part of the transmission cycle, an automatic retransmission mechanism is set up. When it is detected that the valid data frame does not exist, the last valid data frame may be automatically retransmitted at least once when the next packet is transmitted, which greatly reduces a packet loss rate and improves the accuracy of wireless communication. Because a packet loss probability itself is relatively low, this method does not need to wait for the arrival of the response frame in reverse transmission before taking the retransmission measure, but directly performs automatic retransmission, which directly reduces the occurrence of packet loss. In addition, the packet reception identifier in the response frame may be superimposed to further improve the accuracy of data transmission, thus further reducing the occurrence of packet loss.

(3) The reverse transmission precedes the forward transmission, the first communication end can perform synchronization calibration according to the time stamp in the data frame transmitted during reverse transmission, which reduces the requirement of device on clock precision, thus reducing a device cost. This method may be applied to frequency hopping and low power consumption applications, so as to enhance an anti-interference ability and save energy consumption.

(4) This method is not only suitable for one-to-one data communication, but also applicable to one-to-many application scenarios, for example, when this method is applied in wireless keyboard and mouse, the device information needs to be added in the data frame transmitted by the second communication end of the reverse transmission part, so as to realize communication between the second communication end and the plurality of first communication ends.

DETAILED DESCRIPTION

The present invention is further explained and described hereinafter with reference to the drawings and specific embodiments.

A wireless communication method for improving a forward transmission rate comprises a plurality of transmission cycles, wherein the transmission cycle comprises a forward transmission part and a reverse transmission part, and in the forward transmission part, a first communication end sends data and a second communication end receives the data; and in the reverse transmission part, the second communication end sends the data and the first communication end receives the data.

Forward transmission may occur before or after reverse transmission. However, in the case of performing the reverse transmission first and then performing the forward transmission, the data frame transmitted by the second communication end may further contain the packet reception identifier, the first communication end may find out whether the data transmitted in the last communication cycle are all successfully received through the packet reception identifier, and when the data transmitted in the last communication cycle are not all successfully received, the data transmitted in the last communication cycle may be retransmitted to further improve the accuracy of data transmission. In addition, performing the reverse transmission before the forward transmission has an additional function, the data frame transmitted by the second communication end may contain the time stamp, and the first communication end may perform synchronization calibration according to the time stamp, so that the requirement of device on clock precision is reduced, and this method may be applied to frequency hopping and low power consumption applications, so as to improve an anti-interference ability of wireless transmission and save power consumption. In the reverse transmission part of one transmission cycle, the second communication end only needs to transmit one data frame.

Figure 1:
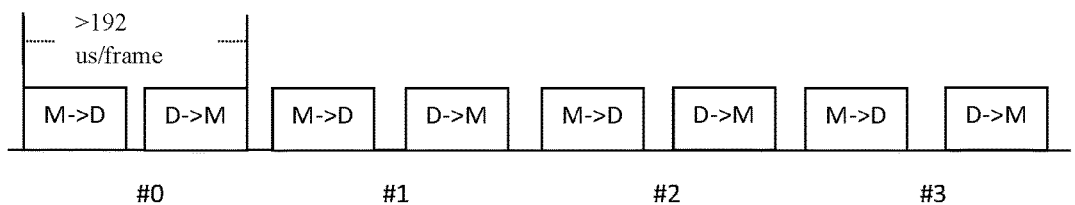
FIG. 1 is a schematic diagram of a communication process of a second method in the prior art.
Figure 2:
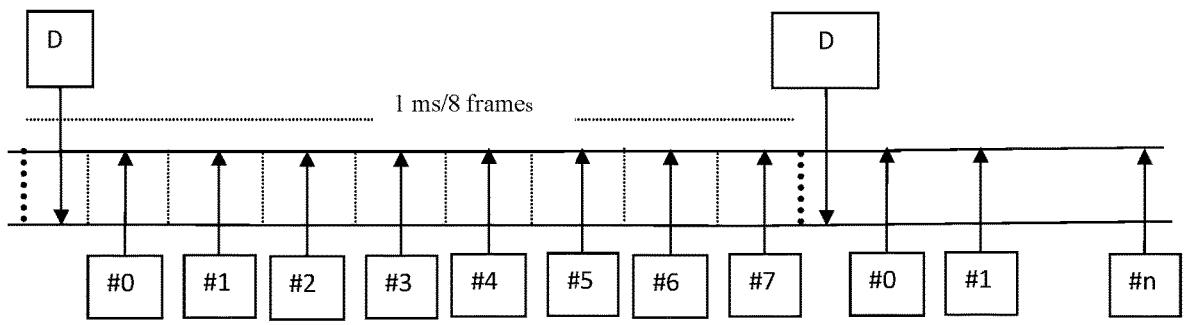
FIG. 2 is a schematic diagram of a communication process of First Embodiment.
Figure 3:
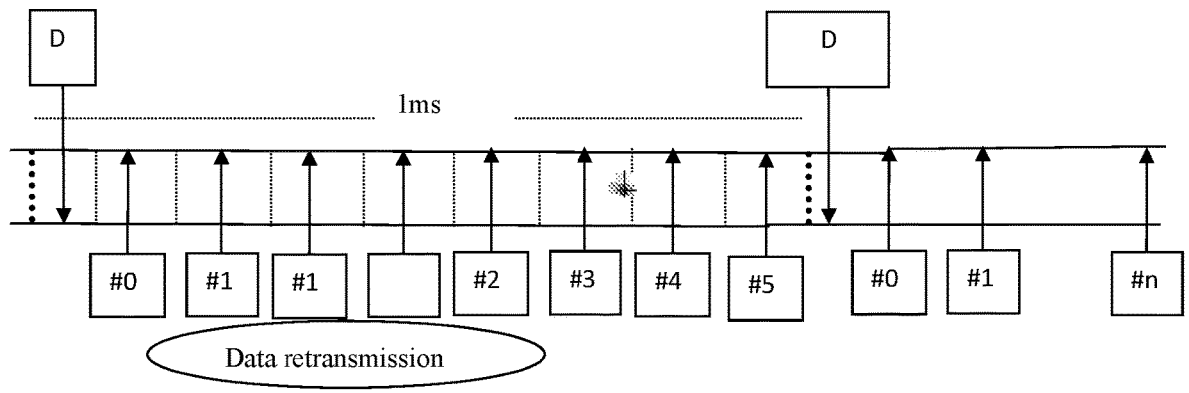
FIG. 3 is a schematic diagram of data retransmission in a method of First Embodiment.

As shown in FIG. 2, the forward transmission part of one transmission cycle is divided into N segments, N≥2, for example, in this embodiment, the forward transmission part is divided into 8 segments. In each segment, the first communication end regularly transmits a valid data frame or an empty packet or does not transmit the valid data frame or the empty packet to the second communication end according to the fact that whether the valid data frame to be transmitted exists or not is detected. Each segment may be detected once, so that the first communication end may transmit 8 valid data frames at most in one cycle. Specifically:

in a first segment of the forward transmission part, when it is detected that a first valid data frame exists, the first communication end transmits the first valid data frame; and when it is detected that the first valid data frame does not exist, the empty packet may be transmitted or no packet is transmitted, and in the case that no packet is transmitted, the second communication end will not receive any packet, leading to timeout retry; and in a non-first segment of the forward transmission part, that is, in a second segment to an eighth segment, it is detected whether the valid data frame to be transmitted exists or not in each segment, when it is detected that next valid data frame exists, the first communication end transmits the next valid data frame; and when it is detected that the next valid data frame does not exist, the first communication end retransmits the last valid data frame at least once; and the valid data frame comprises a sequence number, and when the second communication end receives a data frame with a repeated sequence number, a packet with the repeated sequence number may be eliminated, so as to restore the data. The retransmitting at least once refers to that, for example, when the first segment transmits the first valid data frame, and it is detected that the valid data does not exist during transmission by the second segment, then the first valid data frame is retransmitted; when the valid data still does not exist during transmission by the third segment, no packet is transmitted, or the first valid data frame may be retransmitted; and until the valid data frame is detected in a certain subsequent segment, the valid data frame is transmitted, or until the transmission cycle is ended, the next cycle is started. Generally speaking, the valid data frame only needs to be retransmitted once, and a packet loss probability is greatly reduced, because a probability of two consecutive packet losses is very low. When the last packet transmitted is an empty packet, the empty packet is no longer retransmitted when the valid data frame does not exist subsequently, and until the next valid data frame appears, the valid data frame is transmitted, or until the forward transmission part of this cycle is ended, the reverse transmission part of the next transmission cycle is started. Data retransmission is as shown in FIG. 3. Further, in order to save power consumption, after the last valid data frame is retransmitted once, the first communication end may enter a sleep state, and until it is subsequently detected that the next valid data frame exists, the next valid data frame is transmitted, or until the forward transmission part is ended, the first communication end withdraws from the sleep state.

Figure 4:
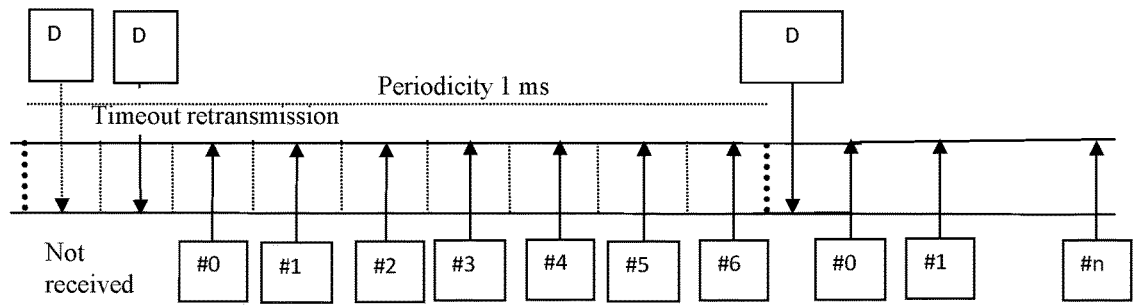
FIG. 4 is a schematic diagram of overtime retransmission in the method of First Embodiment.

In order to prevent the situation that the data frame transmitted by the second communication end of the reverse transmission part will not successively enter the forward transmission part when being not received by the first communication end, a timeout retransmission mechanism may also be provided. The second communication end is switched to a receiving mode after transmitting the data frame to prepare for receiving the data of the forward transmission part, but when the data frame transmitted by the second communication end is not received in a timeout mode, the second communication end is switched back to a transmitting mode again. As shown in FIG. 4, the same data frame as the last data frame transmitted is retransmitted, and then the data are received. FIG. 4 shows that the communication cycle is started from the first packet transmitted reversely, and in the case of timeout retransmission, a proportion of the reverse transmission part can be increased, so that the forward transmission part can only transmit seven packets. It is also available to start from the last packet transmitted reversely no matter how many times the data frame is retransmitted, and in the case of timeout retransmission, the forward transmission part may still transmit eight packets. There is no restriction on subsequent transmission of the two timeout retransmissions. When there is the packet loss of the data frame transmitted by the second communication end for the first time, the data frame transmitted for the second time may be received by the first communication end at this time, thus successively entering the forward transmission part.

A wireless communication device for improving a forward transmission rate comprises a first communication end and a second communication end, wherein the first communication end and the second communication end both comprise a processor, a memory and a software program stored in the memory, and the processor realizes the wireless communication method for improving the forward transmission rate above when executing the software program.

In the device, there may be a plurality of (at least two) first communication ends, and data transmission is performed between the second communication end and the plurality of communication ends. When there are the plurality of first communication ends, in the reverse transmission part, the data frame transmitted by the second communication end needs to contain device information, and the device information is used for indicating an identity of a target first communication end, so as to distinguish who is a receiver of the data frame transmitted. For example, in an application in wireless keyboard and mouse, there are a dongle end, a mouse end and a keyboard end.

This embodiment adopts a transmission mechanism in which one communication end transmits data and a plurality of communication ends receive data, which solves the problem of low data transmission efficiency caused by a transmission mechanism in which one communication end transmits data and one communication end receives data. In addition, automatic retransmission is skillfully applied to solve the problem of packet loss, which is especially suitable for applications with more unidirectionally transmitted data, such as the wireless mouse.

Taking the application of the wireless mouse as an example below, a highest data rate of a common 2.4 G chip is 2 M, that is, 0.5 us/bit. According to theoretical calculation, the beneficial effects of this embodiment are verified.

1. In the case of adopting a second method in the prior art, time from transmitting one frame of data by the mouse end to confirming the completion of data transmission is calculated:

(1) Time Ta1 for transmitting valid data frame by mouse end: (16+32+16+ (8*6)+24)*0.5 us=68 us

| Frame header | Synchronization word | Protocol header | Valid data | CRC check |
|---|---|---|---|---|
| 16 bit | 32 bit | 16 bit | 6 bytes | 24 bit |

(2) Time Ta2 for transmitting response frame by Dongle end: (16+32+16+24)*0.5 us=44 us

| Frame header | Synchronization word | Protocol header | Valid data | CRC check |
|---|---|---|---|---|
| 16 bit | 32 bit | 16 bit | 0 byte | 24 bit |

(3) Time Ta3 for switching RF from receiving mode to transmitting mode (2.4 G RF is half-duplex communication): 80 us to 100 us (common parameter)

To sum up: time from transmitting one frame of data by the mouse end to confirming the completion of data transmission is T=Ta1+Ta3+Ta2>192 us, which cannot realize 8 K return rate.

2. In the case of adopting the method in this embodiment, time from transmitting one frame of data by the mouse end to confirming the completion of data transmission is calculated:

(1) Time Tb1 for transmitting state frame by Dongle end: (16+32+16+ (8*2)+24)*0.5 us=52 us

| Frame header | Synchronization word | Protocol header | Valid data | Valid data | CRC check |
|---|---|---|---|---|---|
| 16 bit | 32 bit | 16 bit | Packet reception identifier | Time stamp | 24 bit |

(2) Time Tb2 for transmitting valid data frame by mouse end: (16+32+16+ (8*6)+24)*0.5 us=68 us

| Frame header | Synchronization word | Protocol header | Valid data | CRC check |
|---|---|---|---|---|
| 16 bit | 32 bit | 16 bit | 6 bytes | 24 bit |

(3) Time Tb3 for switching RF from receiving mode to transmitting mode: 80 us to 100 us (common 2.4 G chip)

(4) Interval time of continuous transmission of RF is Tb4=20 us

To sum up: time from transmitting one frame of data by the mouse end to confirming the completion of data transmission is T=(Tb1+Tb3+(Tb2+Tb4)*8)/8<107 us, which can realize 8 k return rate.

It can be seen from comparison that the wireless mouse can realize 8 k return rate after using the wireless communication method for improving the forward transmission rate in this embodiment, thus improving the performance of the wireless mouse.

What is claimed is:

1. A wireless communication method for improving a forward transmission rate, comprising: a plurality of transmission cycles, wherein each of the transmission cycles comprises a forward transmission part and a reverse transmission part, and in the forward transmission part, a first communication end transmits data and a second communication end receives data; and in the reverse transmission part, the second communication end transmits data and the first communication end receives data;

the forward transmission part of one transmission cycle is divided into N units, N≥2, and in each unit, the first communication end regularly transmits a valid DataFrame or an empty data packet or does not transmit the valid DataFrame or the empty data packet to the second communication end according to whether the valid DataFrame is detected, which specifically comprises that:

in a first unit of the forward transmission part, when a first valid DataFrame is detected, the first communication end transmits the first valid DataFrame; and when the first valid is not detected, the first communication end transmits the data empty packet or does not transmit any data packet; and in a non-first unit of the forward transmission part, when a next valid DataFrame is detected, the first communication end transmits the next valid DataFrame; and when the next valid DataFrame is not detected, the first communication end retransmits a previous valid DataFrame at least once; and the valid DataFrame comprises a sequence number, and the sequence number is used by the second communication end to eliminate a repeated valid DataFrame;

wherein, in the non-first unit of the forward transmission part, when the next valid DataFrame does not exist, no data packet is transmitted after the previous valid DataFrame is retransmitted once, and until the next valid DataFrame is detected, the next valid DataFrame is transmitted, or until the forward transmission part is ended, a next transmission cycle is started; and in the reverse transmission part of one transmission cycle, the second communication end transmits only one DataFrame, in the reverse transmission part, the DataFrame transmitted by the second communication end contains a data packet reception identifier, the data packet reception identifier is used for showing whether data packets transmitted by the first communication end are all successfully received, and when the data packets are all successfully received, the first communication end continues to transmit subsequent data packets; and when the data packets are not all successfully received, the first communication end retransmits the data packets transmitted in a previous transmission cycle.

2. The wireless communication method for improving the forward transmission rate according to claim 1, wherein, in one transmission cycle when at least one data packet is received in the previous transmission cycle, the reverse transmission part precedes the forward transmission part, and in the reverse transmission part, the DataFrame transmitted by the second communication end contains a time stamp, and the first communication end performs synchronization calibration according to the time stamp after receiving the DataFrame containing the time stamp.

3. The wireless communication method for improving the forward transmission rate according to claim 2, wherein the second communication end is switched to a receiving mode after transmitting the DataFrame, and when the second communication end does not receive the packet transmitted by the first communication end in a timeout mode, the second communication end is switched back to a transmitting mode and transmits a same DataFrame to the first communication end.

4. The wireless communication method for improving the forward transmission rate according to claim 1, wherein, after the previous valid DataFrame is retransmitted, the first communication end enters a sleep state, the next valid DataFrame is detected, the next valid data frame is transmitted, or until the forward transmission part is ended, the first communication end withdraws from the sleep state.

5. The wireless communication method for improving the forward transmission rate according to claim 1, wherein, in the reverse transmission part, the DataFrame transmitted by the second communication end contains a device information, and the device information is used for indicating an identity of a target first communication end.

6. A wireless communication device for improving a forward transmission rate, comprising: the first communication end and the second communication end, wherein the first communication end and the second communication end both comprise a processor, a non-transitory memory and a software program stored in the memory, and the processor realizes the wireless communication method for improving the forward transmission rate according to claim 1 when executing the software program.

* * * * *